Feb. 11, 1936.   F. W. JACKMAN   2,030,300
COMPOSITE PHOTOGRAPHY
Filed Oct. 25, 1933
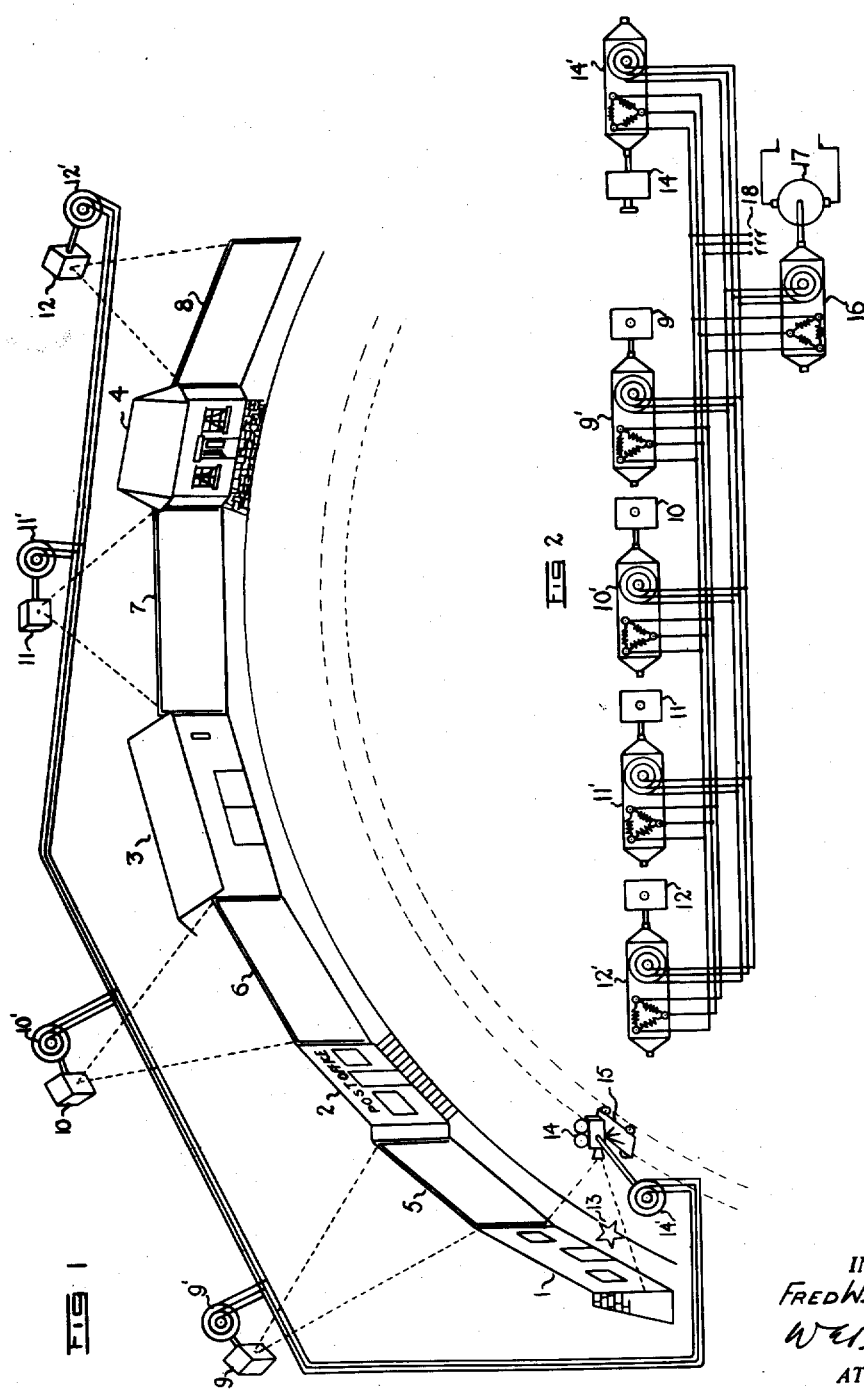
INVENTOR:
FRED W. JACKMAN.
W E Beatty
ATTORNEY.

Patented Feb. 11, 1936

2,030,300

UNITED STATES PATENT OFFICE 2,030,300

COMPOSITE PHOTOGRAPHY

Fred W. Jackman, Beverly Hills, Calif., assignor to Warner Bros. Pictures, Inc., New York, N. Y., a corporation of Delaware Application October 25, 1933, Serial No. 695,118

4 Claims. (Cl. 88—16)

The invention relates to composite photography wherein the background component of a composite picture is constituted by a motion picture projected on a translucent screen, the foreground component or action being photographed in front of the screen by means of a motion picture camera operating synchronously with the projector.

As the foreground action is commonly life-size, it is necessary that the background scene should appear projected on the screen as life-size and not in miniature, and this leads to a screen of gigantic proportions for an extensive background scene.

An object of the invention is to provide a projected background scene which is quite extensive in size, without however employing a screen larger than the ones ordinarily used. This is accomplished by sub-dividing a background scene into units or sections, each of which is separately photographed to prepare positive prints for use later in making the composite picture. Each of these photographs represents a different angular view of a panorama and the units of the panorama are so photographed that stage scenery or natural objects can be employed to conceal the adjacent edges of the projected units. In making the composite picture, there is provided an array of translucent screens arranged on a base line which may be a straight line or a curve as desired, each screen having its own projector, and the space between the edges of adjacent screens being filled with stage scenery or other objects which conform to the scenes projected on the screens. The several projectors are operated in synchronism with each other and with the camera which may be mounted on a dolly and trucked to successively scan the various screens and sets as well as the action taking place before the screens and/or the sets. If desired, the camera may simultaneously photograph a plurality of the screens with the action taking place before one or both of them or before the adjoining set.

In this way, an extensive background scene is provided without employing screens (or projected background scenes) of undue size.

For further details of the invention reference may be made to the drawing wherein:

Fig. 1 is a schematic view of a photographing arrangement according to the present invention.

Fig. 2 is a schematic circuit diagram of electrical means which may be employed to drive the various projectors and the camera in synchronism.

Referring to Fig. 1, there is arranged on a base line, which herein is illustrated as being curved, but which may be straight, a series of full-sized sets 1, 2, 3, 4 interspersed with translucent screens 5, 6, 7, 8. Each such screen is provided with a projector 9, 10, 11, 12, respectively, which projects, as above described, a unit of the background scene onto its screen, the unit of the background thus projected correlating with and supplementing the full-sized adjacent sets. Any desired foreground action such as an actor or the like, and represented by the star 13, takes place at any desired point or points in front of the composite background scene furnished by the sets 1, 2, 3, 4 and the screens 5, 6, 7, 8. The foreground action 13 thus arranged is photographed by the camera 14 which is mounted on a dolly 15 which may be trucked to successively scan the various portions of the composite background scene, 1 to 8 inclusive, and the action taking place before it.

In order to drive the film through the camera 14 in synchronism with the films driven through the projectors 9, 10, 11, 12, these elements are provided with a suitable synchronous coupling. For example, as further shown in Fig. 2, the camera 14 and the projectors 9 to 12, inclusive, are driven respectively by synchronous motors 14' and 9' to 12' inclusive. It will be understood that the electrical connections between these various motors are in the form of flexible cables, particularly to allow the camera 14 to travel along the path indicated in Fig. 1 or along any other suitable path. These motors, 14' and 9' to 12', are illustrated as three-phase motors, the slip rings of which are connected together and to the slip rings of the distributor 16 which sets the pace for the various motors and which in turn is driven by a constant speed D. C. motor 17. The three-phase field windings of all the motors 14' and 9' to 12' and of distributor 16 are supplied with current from a suitable three-phase line 18. It seems unnecessary to describe the three-phase interlock system in Fig. 2 in further detail as this circuit arrangement is well understood in the art and has been commonly used to drive a camera and a sound recorder in synchronism.

The camera 14 is threaded with high speed film as described in application, Serial Number 538,718, filed May 20, 1931 by W. E. Beatty. Also the translucent screens 5, 6, 7 and 8 are provided with a water soluble translucent coating as described and claimed in application Serial Number 561,871, filed September 9, 1931 by applicant. This coating may taper in thickness from the center of the screen toward the edges thereof to off-set the hot spot in the picture projected on the screen and to provide a projected picture of uniform light intensity as described in the above mentioned application. The following coating material, which may be sprayed on the screen, gives good results: one pound of rice flour is dissolved slowly in one-half of a bucket (3-gallon bucket) of warm water. After this is thoroughly dissolved, the mixture having the consistency of thin paint, add one-half pint of a pigment such as whiting, and stir well. Then add one-half pint of condensed milk, preferably "Pet" brand. The mixture should be well stirred and should have the consistency of paint suitable for spraying. The consistency can be controlled, of course, by varying the amount of water in the mixture. A number of such coats, such as five or six, should be applied, each coat being allowed to dry before applying the next coat. The drying may be assisted by means of an electric fan to direct a current of air on the coating, and in this case each coating will become dry in from ten to fifteen minutes or more, depending upon the temperature and humidity of the air.

Also this hot spot can be reduced by trucking the camera 14 across the front of each screen in such a way that the optical axis of the camera 14 is inclined to the optical axes of the projector.

It will be understood that the action 13 is illuminated with lights which are not shown and which are so disposed and shielded as to keep all light possible from falling on the screen or screens 5, 6, 7, 8, these action lights being incandescent lamps which illuminate the action 13 so that the intensity thereof is comparable with the intensity of the picture projected on the screen. Also, the sets 1, 2, 3, 4 are suitably illuminated with incandescent lamps not illustrated.

It will be apparent that various modifications may be made in the invention: for example, as above described, the camera 14 may simultaneously photograph two or more of the projected background scenes with suitable foreground action in front thereof, instead of being trucked to photograph the projected background scenes and correlated sets sequentially. Also a simpler type of synchronous coupling, such as single-phase A. C. motors, may be employed to operate the projectors and camera in synchronism. Also the screens may be arranged one above the other, the camera being mounted on a crane or elevator to scan the screens sequentially. Also the sets, projected pictures and action may be in miniature, the action in this case being for example, a miniature automobile, train or the like. Also the base line on which the sets and the screens are arranged may be a closed curve such as a circle or the like instead of the open curve as illustrated. Also the action 13, such as an actor on foot or in a vehicle, may progress across the front of the composite background scene, 1 to 8 inclusive, while remaining in the field of view of the moving camera 14 which therefore photographs the action 13 as it moves along in front of the various sets and screens. Or the action 13 may be photographed while traversing the front of portions of the composite background scene such as set 1 and screen 5, whereupon the action 13 moves out of the field of view of the camera which thereupon or later picks up other action in front of another portion of the composite background scene.

Having thus described the invention, what is claimed as new and desired to secure by Letters Patent is:

1. The method of photographically producing a composite picture which comprises simultaneously projecting motion pictures representing supplementary portions of a background scene onto a series of different translucent screens materially separated to provide spaces for correlated portions of actual scenery, said screen scenes and scenery forming a large background area for continuous foreground action and synchronously therewith photographing said screens and said portions of actual scenery sequentially while said foreground action takes place in front thereof.

2. Apparatus for photographically producing a composite picture of a foreground and a background, said background comprising a plurality of separated translucent screens with portions of supplementary scenery interposed between said screens to form an extended continuous background, a projector for each of said screens for projecting correlated background scenes appropriate to said portions of supplementary scenery thereon, a camera, said screens and supplementary scenery extending beyond the field of the lens of said camera, means for moving said camera to photograph successive portions of said background while said foreground is in front of said background, and means for operating said camera and said projectors in synchronism.

3. A method of photography which comprises projecting motion pictures representing correlated portions of a background scene onto a series of projection screens conjoined with portions of actual scenery to form an elongated composite background, arranging a motion picture camera with relation to said background so that said background extends beyond the field of said camera, and moving said camera to photograph successive portions of said background, while projecting said motion pictures and operating said camera in synchronism.

4. Photographic apparatus comprising a plurality of separated screens, a motion picture projector for each of said screens for projecting supplementary motion picture background scenes thereon, sections of supplementary scenery interposed between said screens to form a continuous extended background, a camera arranged in front of said screens and said scenery so that said scenery and screens extend beyond the field of the lens of said camera, means for operating said camera and said projectors in synchronism, and means for moving said camera to photograph successive portions of said screens and said scenery while operating said first mentioned means.

FRED W. JACKMAN.